United States Patent
Yeh et al.

(10) Patent No.: US 9,690,490 B2
(45) Date of Patent: Jun. 27, 2017

(54) METHOD FOR WRITING DATA, MEMORY STORAGE DEVICE AND MEMORY CONTROL CIRCUIT UNIT

(71) Applicant: PHISON ELECTRONICS CORP., Miaoli (TW)

(72) Inventors: Chih-Kang Yeh, Kinmen County (TW); Li-Chun Liang, Kaohsiung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 120 days.

(21) Appl. No.: 14/253,886

(22) Filed: Apr. 16, 2014

(65) Prior Publication Data
US 2015/0242122 A1 Aug. 27, 2015

(30) Foreign Application Priority Data
Feb. 21, 2014 (TW) .............................. 103105910 A

(51) Int. Cl.
*G06F 12/00* (2006.01)
*G06F 3/06* (2006.01)
*G06F 11/00* (2006.01)

(52) U.S. Cl.
CPC ............ *G06F 3/061* (2013.01); *G06F 3/0611* (2013.01); *G06F 3/0619* (2013.01);
(Continued)

(58) Field of Classification Search
CPC ...... G06F 3/061; G06F 3/0679; G06F 3/0659; G06F 3/0611; G06F 3/0619; G06F 2206/1014
See application file for complete search history.

(56) References Cited

U.S. PATENT DOCUMENTS

| 2010/0079314 A1* | 4/2010 | Gonion ................... H03M 7/40 341/67 |
| 2011/0145486 A1* | 6/2011 | Owa ................... G06F 12/0246 711/103 |
| 2013/0275396 A1* | 10/2013 | Condict ................ H03M 7/607 707/693 |

FOREIGN PATENT DOCUMENTS

| JP | 54-070709 | | 6/1979 |
| JP | 54070709 A | * | 6/1979 |
| TW | 201207621 | | 2/2012 |

OTHER PUBLICATIONS

Ningning Hu, Network Aware Transmission with Compression, 2001, Carnegie Mellon University.*

(Continued)

*Primary Examiner* — Kalpit Parikh
(74) *Attorney, Agent, or Firm* — Jianq Chyun IP Office

(57) ABSTRACT

A method for writing data, a memory storage device and a memory control circuit unit are provided. The method includes receiving a write command and first data corresponding to the write command, obtaining initial data transmission information of the first data and determining whether the initial data transmission information conforms to a predetermined condition, compressing the first data to second data and writing the second data into a rewritable non-violate memory module if the initial data transmission information conforms to the predetermined condition, and writing the uncompressed first data into the rewritable non-violate memory module if the initial data transmission information does not conform to the predetermined condition.

27 Claims, 7 Drawing Sheets

(52) U.S. Cl.
CPC .......... *G06F 3/0659* (2013.01); *G06F 3/0679* (2013.01); *G06F 11/00* (2013.01); *G06F 12/00* (2013.01); *G06F 2206/1014* (2013.01)

(56) References Cited

OTHER PUBLICATIONS

"Office Action of Taiwan Counterpart Application", issued on Dec. 24, 2015, p. 1-p. 10.

\* cited by examiner

METHOD FOR WRITING DATA, MEMORY STORAGE DEVICE AND MEMORY CONTROL CIRCUIT UNIT

CROSS-REFERENCE TO RELATED APPLICATION

This application claims the priority benefit of Taiwan application serial no. 103105910, filed on Feb. 21, 2014. The entirety of the above-mentioned patent application is hereby incorporated by reference herein and made a part of this specification.

BACKGROUND

Technology Field

The present invention is related to a method for writing data and more particularly, to a method for writing data and a memory storage device and a memory control unit using the same.

Description of Related Art

The markets of digital cameras, mobile phones, and MP3 players have expanded rapidly in recent years, resulting in escalated demand for storage media by consumers. Due to having characteristics, such as data non-volatility, low power consumption, compact size and no mechanical structure, the rewritable non-volatile memory module is suitable for being built in the aforementioned portable multi-media devices listed for example.

Before being written into the rewritable non-volatile memory module, data may be compressed to save storage spaces of the rewritable non-volatile memory module. However, for some data having a greater size after being compressed or having bad compression/decompression efficiency, a read speed for subsequently reading the data may be dramatically dropped if the data is compressed and then stored into the rewritable non-volatile memory.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a method for writing data, a memory storage device and a memory control circuit unit capable of determining whether to compress data according to data transmission information of the data before the data is written into a rewritable non-volatile memory module, so as to balance the reduction of data size with the maintenance of data reading capability.

According to an exemplary embodiment of the present invention, a method for writing data for controlling a memory control circuit unit is provided. The method includes the following steps. A write command and first data corresponding to the write command are received. Initial data transmission information of the first data is obtained, and whether the initial data transmission information conforms to a predetermined condition is determined. If the initial data transmission information conforms to the predetermined condition, the first data is compressed to second data, and the second data is written into a rewritable non-violate memory module. And, if the initial data transmission information does not conform to the predetermined condition, the uncompressed first data is written into the rewritable non-violate memory module.

According to another exemplary embodiment of the present invention, a memory storage device is provided. The memory storage device includes a connection interface unit, a rewritable non-volatile memory module and a memory management circuit. The connection interface unit is configured to be coupled to a host system. The memory control circuit unit is coupled with the connection interface unit and the rewritable non-volatile memory module. The memory control circuit unit is configured to perform operations of obtaining initial data transmission information of the first data and determining whether the initial data transmission information conforms to a predetermined condition, compressing the first data to second data and writing the second data into a rewritable non-violate memory module if the initial data transmission information conforms to the predetermined condition, and writing the uncompressed first data into the rewritable non-violate memory module if the initial data transmission information does not conform to the predetermined condition.

According to yet another exemplary embodiment of the present invention, a memory control circuit unit is provided. The memory control circuit unit is configured to control a rewritable non-volatile memory module and includes a host interface, a memory interface, a compression/decompression circuit and a memory management circuit. The host interface is configured to be coupled to a host system. The memory interface is configured to be coupled to the rewritable non-volatile memory module. The memory management circuit is coupled with the host interface, the memory interface and the compression/decompression circuit. The memory management circuit is configured to perform operations of receiving a write command and first data corresponding to the write command, obtaining initial data transmission information of the first data and determining whether the initial data transmission information conforms to a predetermined condition, controlling the compression/decompression circuit to compress the first data to second data and, sending a first command sequence configured to instruct the second data to be written into the rewritable non-violate memory module if the initial data transmission information conforms to the predetermined condition, and sending a second command sequence configured to instruct the first data to be written into the rewritable non-violate memory module if the initial data transmission information does not conform to the predetermined condition.

Based on the above, in the present invention, after receiving the write command and the data corresponding to the write command, the initial transmission information of the data is obtained, and whether to compress the data is determined according to the data transmission information so as to effectively reduce issues that the speed of reading the data is affected due to bad efficiency of decompressing the data.

In order to make the aforementioned and other features and advantages of the present invention more comprehensible, several embodiments accompanied with figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
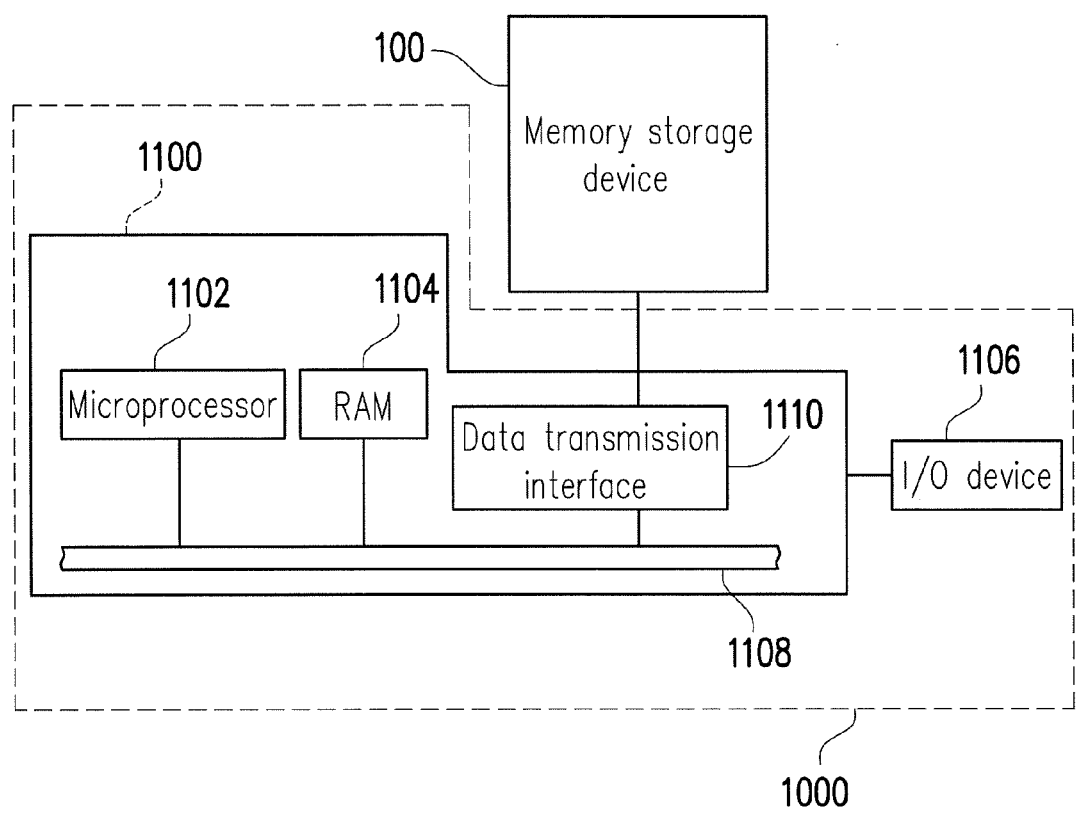
FIG. 1 illustrates a host system and a memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (i.e. a memory storage system) includes a rewritable non-volatile memory module and a controller (i.e. a control circuit). The memory storage device is usually used together with a host system, such that the host system can write data into or read data from the memory storage device.

Figure 2:
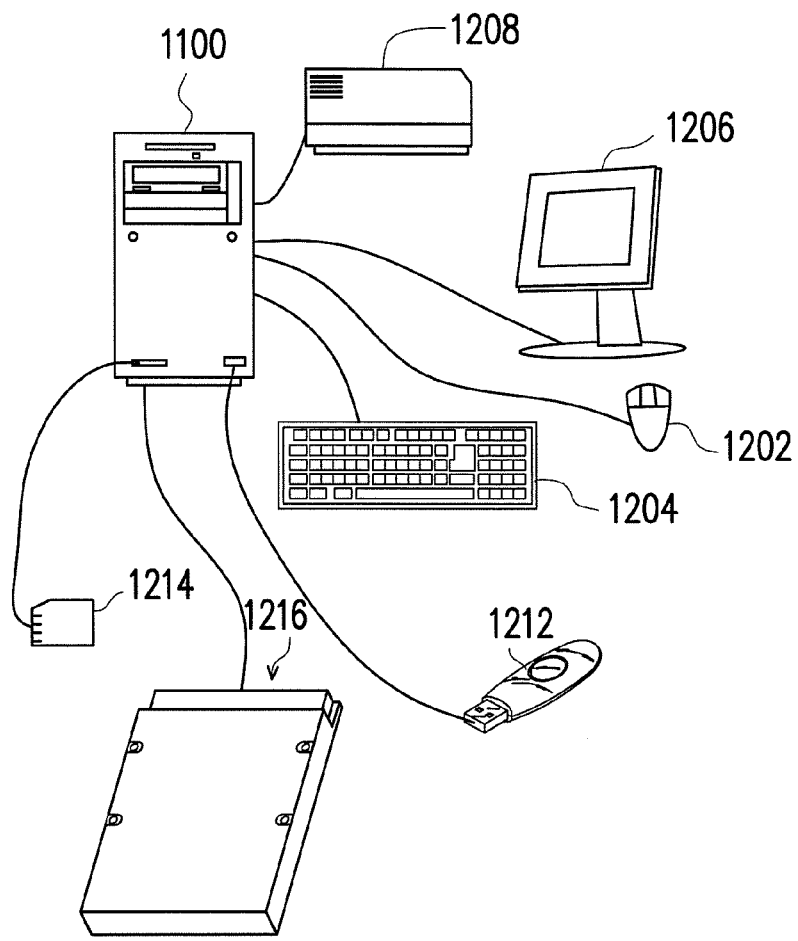
FIG. 2 is a schematic diagram of a computer, an input/output device, and a memory storage device according to an exemplary embodiment of the present invention.
Figure 3:
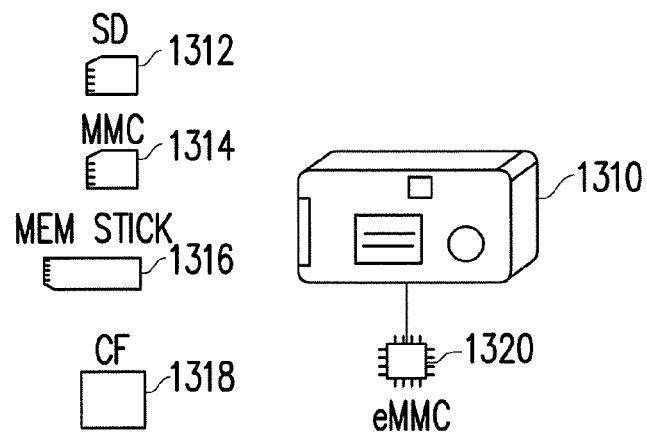
FIG. 3 is a schematic diagram of a host system and a memory storage device according to an exemplary embodiment of the present invention.

FIG. 1 illustrates a host system and a memory storage device according to an exemplary embodiment of the present invention. FIG. 2 is a schematic diagram of a computer, an input/output device, and a memory storage device according to an exemplary embodiment of the present invention. FIG. 3 is a schematic diagram of a host system and a memory storage device according to an exemplary embodiment of the present invention.

Referring to FIG. 1, a host system 1000 typically includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the present exemplary embodiment of the present invention, the memory storage device 100 is coupled to other elements of the host system 1000 through the data transmission interface 1110. With the operation of the microprocessor 1102, the random access memory (RAM) 1104 and the I/O device 1106, data can be written into or read from the memory storage device 100. For instance, the memory storage device 100 may be a rewritable non-volatile memory storage device, such as a flash drive 1212, a memory card 1214, or a solid state drive (SSD) 1216, as shown in FIG. 2.

Generally speaking, the host system 1000 can substantially be any system collocated with the memory storage device 100 for storing data. In the present exemplary embodiment, the host system 1000 is illustrated as a computer system for description. However, in another exemplary embodiment of the present invention, the host system 1000 may be a system, such as a digital camera, a video camera, a communication device, an audio player, or a video player. For example, in a scenario that the host system is a digital camera (video camera) 1310, the rewritable non-volatile memory storage device is a secure digital (SD) card 1312, a multimedia card (MMC) 1314, a memory stick 1316, a compact flash (CF) card 1318 or an embedded storage device 1320 (as shown in FIG. 3). The embedded storage device 1320 includes an Embedded MMC (eMMC). It should be mentioned that the eMMC is directly coupled to a substrate of the host system.

Figure 4:
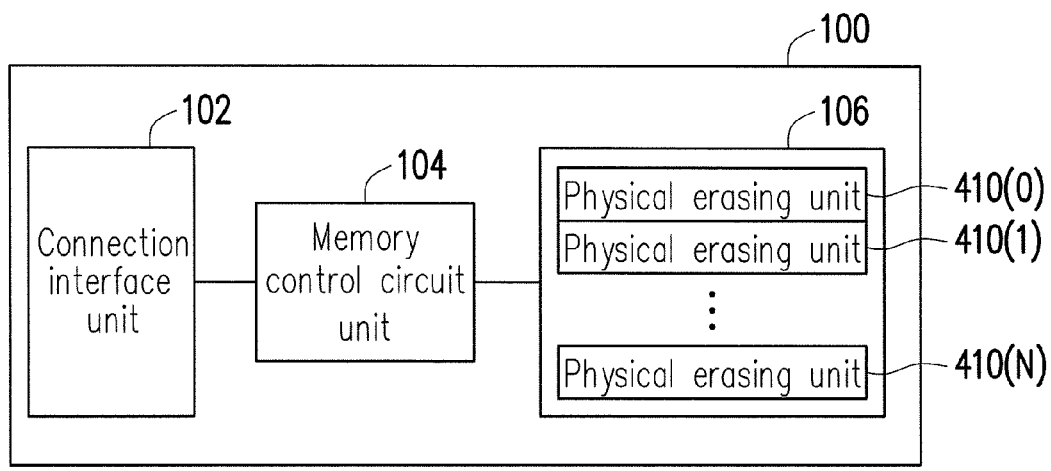
FIG. 4 is a schematic block diagram of the memory storage device illustrated in FIG. 1.

FIG. 4 is a schematic block diagram of the memory storage device illustrated in FIG. 1.

Referring to FIG. 4, the memory storage device 100 includes a connection interface unit 102, a memory control circuit unit 104, and a rewritable non-volatile memory module 106.

In the present embodiment, the connection interface unit 102 complies with a serial advanced technology attachment (SATA) standard. However, it should be understood that the present invention is not limited thereto, and the connection interface unit 102 may also comply with the Parallel Advanced Technology Attachment (PATA) standard, the Institute of Electrical and Electronic Engineers (IEEE) 1394 standard, the peripheral component interconnect express (PCI Express) standard, the universal serial bus (USB) standard, the Ultra High Speed-I (UHS-I) interface standard, the Ultra High Speed-II (UHS-II) interface standard, Secure Digital (SD) interface standard, the memory stick (MS) interface standard, the multimedia card (MMC) interface standard, the compact flash (CF) interface standard, the integrated device electronics (IDE) standard, or other suitable standards. In the present exemplary embodiment, the connection interface unit may be package with the memory control circuit unit in one chip or laid outside a chip having the memory control circuit unit.

The memory control circuit unit 104 is configured to execute a plurality of logic gates or control commands which are implemented in a hardware form or in a firmware form and perform operations such as data writing, reading or erasing in the rewritable non-volatile memory module 106 according to the command of the host system 1000.

The rewritable non-volatile memory module 106 is coupled to the memory control circuit unit and configured to store data written by the host system 1000. The rewritable non-volatile memory module 106 includes a plurality of physical erasing units 410(0)-410(N). The physical erasing units 410(0)-410(N) may belong to the same memory die or different memory dies. Each of the physical erasing units includes a plurality of physical programming units, and the physical programming units belonging to the same physical erasing unit may be written separately but erased at the same time. In the present exemplary embodiment, each of the physical erasing units is composed of 64 physical programming units. However, in other exemplary embodiment of the present invention, each of the physical erasing units may be composed of 128 or 256 physical programming units or any other number of physical programming units.

To be more specific, a physical erasing unit is the smallest unit for data erasing. That is to say, each of the physical erasing units has the least number of memory cells to be erased altogether. Each of the physical programming unit is the smallest programming unit. Namely, each of the physical programming unit is the smallest unit for writing data. Each of the physical programming units generally includes a data bit area and a redundant bit area. The data bit area includes a plurality of physical access addresses for storing user data, and the redundant bit area is configured for storing system data (e.g., control information and error correcting codes). In the present exemplary embodiment, each data bit area of the physical programming unit contains 4 physical access addresses, and the size of each physical access address is 512 bytes (512B). However, in other exemplary embodiments, the data bit area may contain more or less number of physical access addresses, and the present invention is not intended to limit the size and the number of the physical access addresses. For instance, in an exemplary embodiment, the physical erasing units are physical blocks, and the physical programming units are physical pages or physical sectors, which are not limited in the present invention.

In the present exemplary embodiment, the rewritable non-volatile memory module 106 may be a multi-level cell (MLC) NAND flash memory module (i.e., a flash memory module capable of storing data of 2 bits in one memory cell). However, the present invention is not limited thereto, and the rewritable non-volatile memory module 106 may also be a single-level cell (SLC) NAND flash memory module (i.e., a flash memory module capable of storing data of one bit in one memory cell), a trinary-level cell (TLC) NAND flash memory module (i.e., a flash memory module capable of storing data of 3 bits in one memory cell), any other flash memory module, or any other memory module with the same characteristics.

Figure 5:
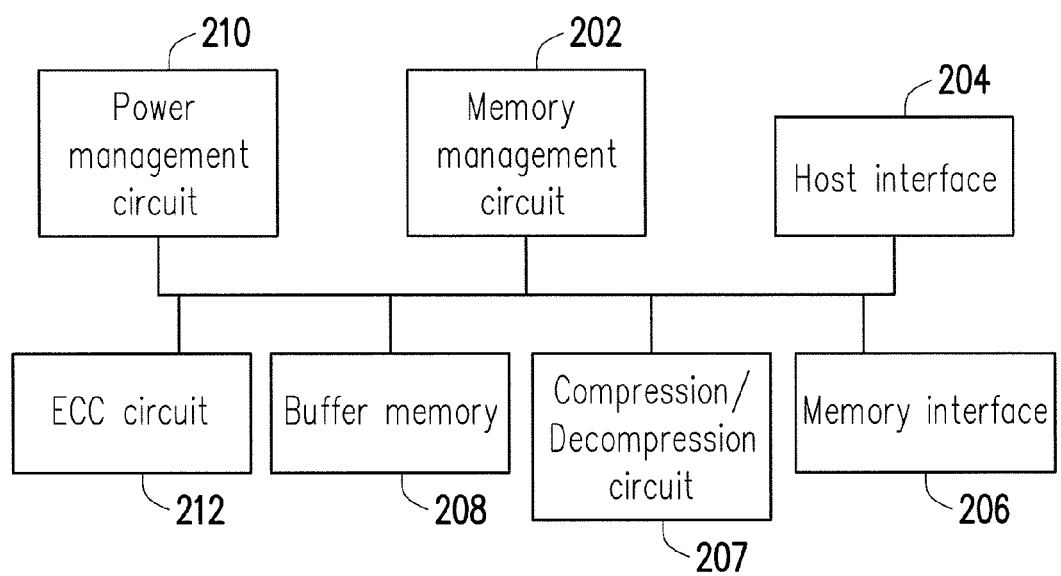
FIG. 5 is a schematic block diagram of a memory control circuit unit according to an exemplary embodiment of the present invention.

FIG. 5 is a schematic block diagram of a memory control circuit unit according to an exemplary embodiment of the present invention.

Referring to FIG. 5, the memory control circuit unit 104 includes a memory management circuit 202, a host interface 204, a memory interface 206, and a compression/decompression circuit 207.

The memory management circuit 202 is configured for controlling the overall operation of the memory control circuit unit 104. Specifically, the memory management circuit 202 has a plurality of control commands, and if the memory storage device 100 is operated, the control commands are executed to perform various data operations, such as data writing, data reading and data erasing.

In the present exemplary embodiment, the control commands of the memory management circuit 202 are implemented in a firmware form. For instance, the memory management circuit 202 has a microprocessor (not shown) and a read-only memory (not shown), and the control commands are burnt into the read-only memory. If the memory storage device 100 is operated, the control commands are executed by the microprocessor to perform various data operations, such as data writing, data reading or data erasing.

In another exemplary embodiment of the present invention, the control commands of the memory management circuit 202 may also be stored in a specific area (e.g., a system area in the memory module exclusively used for storing system data) of the rewritable non-volatile memory module 106 as program codes. Moreover, the memory management circuit 202 has a microprocessor unit (not shown), a read-only memory (not shown), and a random access memory (not shown). Specifically, the read-only memory has a boot code. If the memory control circuit unit 104 is enabled, the microprocessor unit first executes the boot code for loading the control commands stored in the rewritable non-volatile memory module 106 into the random access memory of the memory management circuit 202. Afterwards, the microprocessor unit executes the control commands for various data operations such as data writing, data reading and data erasing.

Additionally, in another exemplary embodiment of the present invention, the control commands of the memory management circuit 202 may also be implemented in a hardware form. For example, the memory management circuit 202 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the physical erasing units of the rewritable non-volatile memory module 106. The memory writing circuit is configured to issue a write command to the rewritable non-volatile memory module 106 for writing data thereto. The memory reading circuit is configured to issue a read command to the rewritable non-volatile memory module 106 for reading data therefrom. The memory erasing circuit is configured to issue an erase command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured for receiving and identifying commands and data transmitted from the host system 1000. Namely, the commands and data sent by the host system 1000 are transmitted to the memory management circuit 202 through the host interface 204. In the present exemplary embodiment, the host interface 204 complies with the SATA standard. However, it should be understood that the present invention is not limited thereto, and the host interface 204 may also comply with the PATA standard, the IEEE 1394 standard, the PCI Express standard, the USB standard, the UHS-I standard, the UHS-II standard, the SD standard, the MS standard, the MMC standard, the CF standard, the IDE standard, or other suitable standards for data transmission.

The memory interface 206 is coupled to the memory management circuit 202 and configured for accessing the rewritable non-volatile memory module 106. In other words, the data intended to be written into the rewritable non-volatile memory module 106 is converted to a format acceptable for the rewritable non-volatile memory module 106 by the memory interface 206.

The compression/decompression circuit 207 is coupled to the memory management circuit 202 and configured for performing compression/decompression of data. In the present exemplary embodiment, the compression/decompression circuit 207 is controlled by the memory management circuit 202 to perform the compression/decompression of data. However, in another exemplary embodiment, the compression/decompression circuit 207 may also be implemented in the memory management circuit 202, which is not limited in the present invention. The compression/decompression circuit 207 is operated by utilizing various data compression techniques, such as the Lempel-Ziv-Welch compression (LZW) compression technique, the Huffman compression technique, the adaptive Huffman compression technique, the Hu-Tucker compression technique, the arithmetic compression technique, the adaptive arithmetic compression technique, the Run-length compression technique or the dictionary compression technique, which is not limited in the present invention.

In an exemplary embodiment, the memory control circuit unit 104 further includes a buffer memory 208, a power management circuit 210, and an error checking and correcting (ECC) circuit 212.

The buffer memory 208 is coupled to the memory management circuit 202 and configured for temporarily storing data and commands from the host system 1000 or data from the rewritable non-volatile memory module 106.

The power management circuit 210 is coupled to the memory management circuit 202 and configured for controlling the power of the of the memory storage device 100.

The ECC circuit 212 is coupled to the memory management circuit 202 and configured for executing an error checking and correcting procedure to ensure the accuracy of data. To be specific, if the memory management circuit 202 receives a write command from the host system 1000, the ECC circuit generates a corresponding ECC code for the data corresponding to the write command, and the memory management circuit 202 writes the data corresponding to the write command and the corresponding ECC code into the rewritable non-volatile memory module 106. Subsequently, if reading the data from the rewritable non-volatile memory module 106, the memory management circuit 202 simultaneously reads the corresponding ECC code, and the ECC circuit 212 executes the error checking and correcting procedure for the read data based on the ECC code.

Figure 6:
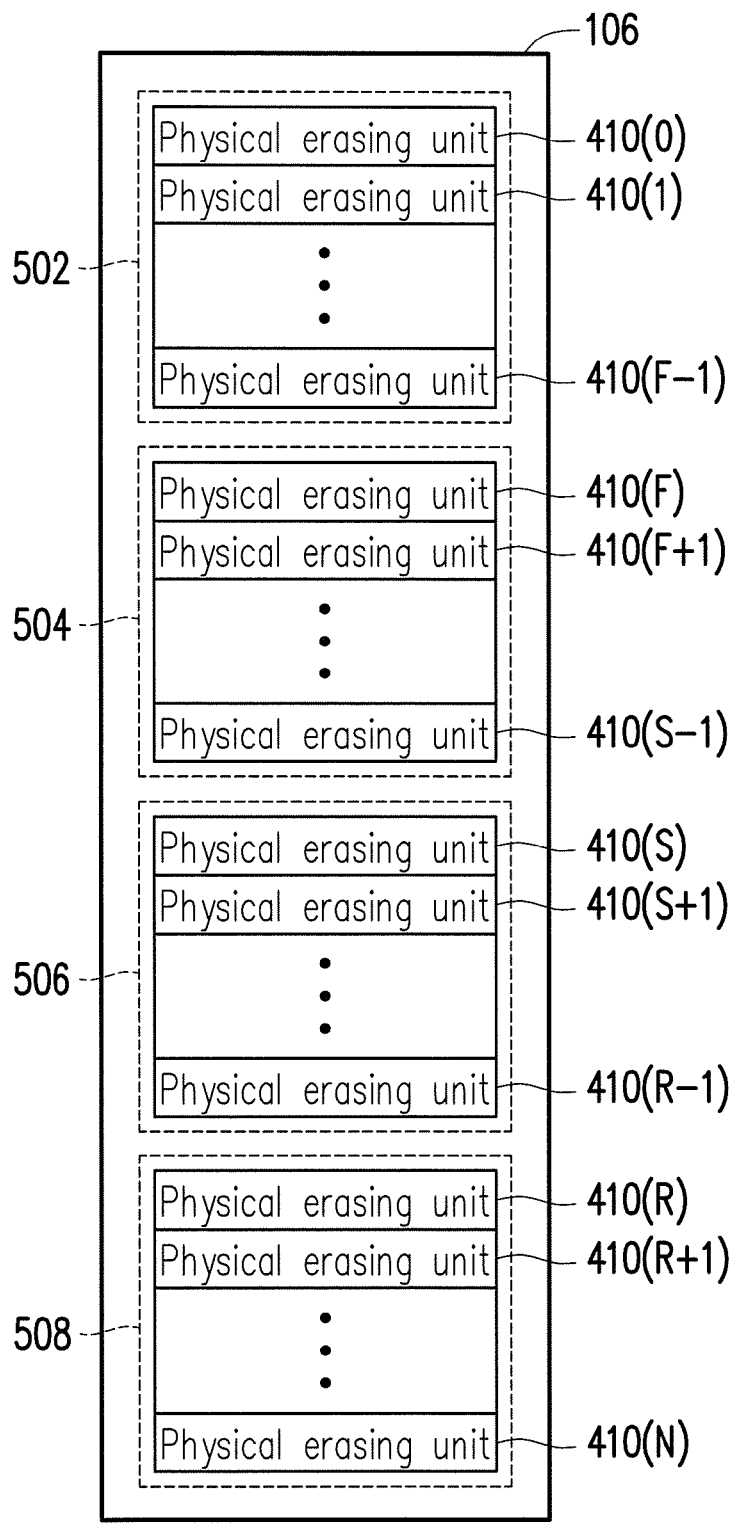
FIG. 6 and FIG. 7 are exemplary schematic diagrams illustrating examples of managing a rewritable non-volatile memory module according to an exemplary embodiment of the present invention.
Figure 7:
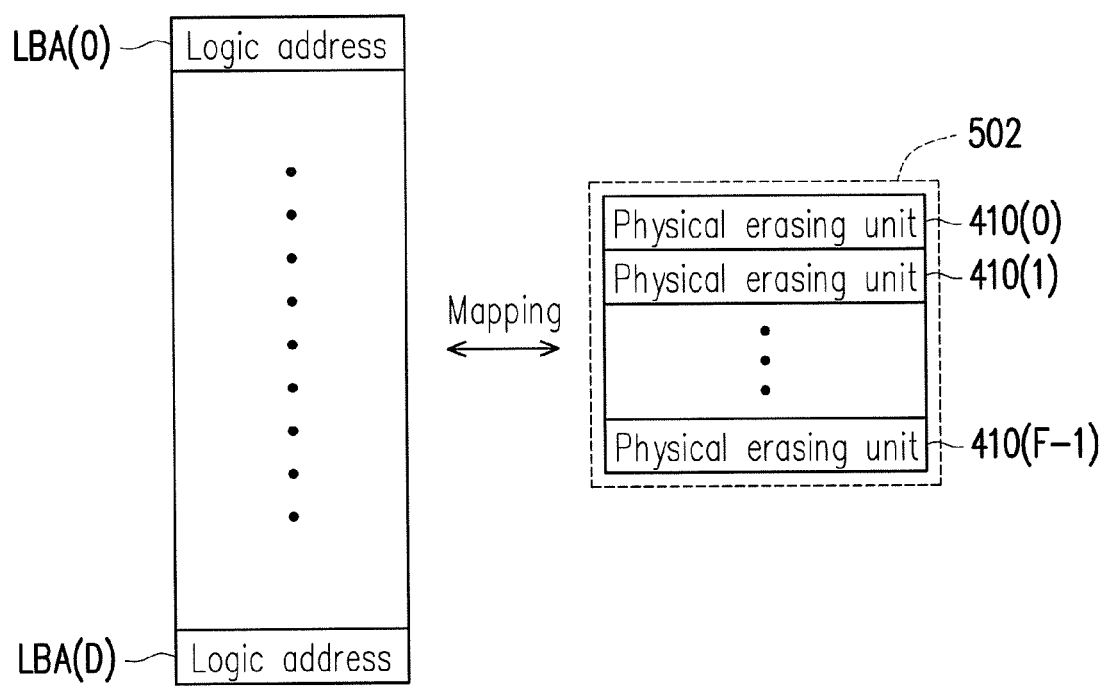

FIG. 6 and FIG. 7 are exemplary schematic diagrams illustrating examples of managing a rewritable non-volatile memory module according to an exemplary embodiment.

It should be understood that terms, such as "select", "divide", "associate" and so forth, are logical concepts which describe operations in the physical erasing units of the rewritable non-volatile memory module 106. That is, the physical erasing units of the rewritable non-volatile memory module are logically operated, but actual positions of the physical erasing units of the rewritable non-volatile memory module are not changed.

Referring to FIG. 6, the memory management circuit 202 may logically divide the physical erasing units 410(0) through 410(N) into a data area 502, a spare area 504, a system area 506, and a replacement area 508.

The physical erasing units logically belonging to the data area 502 and the spare area 504 are configured to store data from the host system 1000. To be specific, the physical erasing units of the data area 502 are the physical erasing units which have been used for storing data, and the physical erasing units of the spare area 504 are the physical erasing units which are used for replacing the physical erasing units of the data area 502. Namely, if a write command and data to be written are received from the host system 1000, the memory management circuit 202 selects a physical erasing unit from the spare area 504 and writes the data into the selected physical erasing unit to replace the physical erasing units of the data area 502.

The physical erasing units logically belonging to the system area 506 are configured to record system data. For instance, the system data includes the manufacturers and models of the rewritable non-volatile memory module 106, the number of physical erasing units in the rewritable non-volatile memory module 106, the number of physical programming units in each physical erasing unit, and so on.

The physical erasing units logically belonging to the replacement area 508 are used in a bad physical erasing unit replacement procedure for replacing damaged physical erasing units. Specifically, if there are still normal physical erasing units in the replacement area, and a physical erasing unit in the data area 502 is damaged, the memory management circuit 202 selects one normal physical erasing unit from the replacement area 508 to replace the damaged physical erasing unit.

In particular, the numbers of physical erasing units in the data area 502, the spare area 504, the system area 506 and the replacement area 508 vary with different memory module standards. Additionally, it should be understood that the grouping relations of associating the physical erasing units to the data area 502, the spare area 504, the system area 506 and the replacement area 508 are dynamically changed during the operations of the memory storage device 100. For example, if a physical erasing unit in the spare area 504 is damaged and replaced by a physical erasing unit in the replacement area 508, the physical erasing unit which is previously in the replacement area 508 is associated to the spare area 504.

Referring to FIG. 7, the memory control circuit unit 202 configured logical addresses LBA(0) through LBA(D) for accessing data in the alternating manner in the physical erasing units where data are stored. For example, if the memory storage device 100 is formatted by a file system (e.g., FAT 32), the logical addresses LBA(0) through LBA (D) are respectively mapped to the physical erasing units 410(0) through 410(F−1) in the data area 502. Moreover, the memory management circuit 202 establishes a logical address-physical erasing unit mapping table for recording the mapping relationship between the logical addresses and the physical erasing units. In the present exemplary embodiment, a size of each of the logical addresses LBA(0) through LBA(D) is identical to a size of each of the physical erasing units 410(0) through 410(F−1), and the logical addresses may also referred to as logical block addresses (LBAs). Additionally, in another exemplary embodiment of the present invention, the size of each of the logical addresses LBA(0) through LBA(D) may be a size of physical programming unit or any other size, and the present invention is not limited thereto.

In the present exemplary embodiment, the memory management circuit 202 receives a write command and data (referred to as first data hereinafter) corresponding to the write command from the host system 1000. Then, the memory management circuit 202 obtains data transmission information (referred to as initial data transmission information) of the first data and determines whether to compress the first data according to the initial data transmission information. If the memory management circuit 202 determines to compress the first data, the memory management circuit 202 controls the compression/decompression circuit 207 to compress the first data to another data (referred to as second data hereinafter) and writes the second data into the rewritable non-violate memory module 106. For instance, the memory management circuit 202 may send a first command sequence containing one or more commands to the rewritable non-volatile memory module 106. The first command sequence is configured to instruct the second data to be written into the rewritable non-volatile memory module 106. However, if the memory management circuit 202 determines not to compress the first data, the memory management circuit 202 directly writes the uncompressed first data into the rewritable non-volatile memory module 106. For instance, the memory management circuit 202 may send a second command sequence containing one or more commands to the rewritable non-volatile memory module 106. The second command sequence is configured to instruct the uncompressed first data to be written into the rewritable non-volatile memory module 106. It is to be mentioned that in the present exemplary embodiment, each of the command sequences may contain one or more command codes.

In the present exemplary embodiment, the initial data transmission information of the first data includes at least one of information with respect to a compression ratio of the first data, information with respect to a compression speed of the first data, information with respect to a data stream transmission speed of the second data, information with respect to a decompression speed of the second data, information with respect to a data stream transmission speed of the decompressed second data and information with respect to whether the first data is sequential data or a combination thereof, but the present invention is not limited thereto. In another exemplary embodiment, the initial data transmission information does not include file formats.

In the present exemplary embodiment, the compression ratio of the first data refers to a decreased data volume of the compressed first data to a data volume of the uncompressed first data. For instance, the memory management circuit 202 may estimate a data volume of the second data. Then, the memory management circuit 202 may deduct the data volume of the first data by the data volume of the second data to obtain the numerator of the compression ratio and serve the data volume of the first data as the denominator of the compression ratio, and thereby, the compression ratio of the first data is obtained. For example, it is assumed that the data volume of the first data is 4 kB and the data volume of the second data is 3 kB, the memory management circuit 202 may obtain the data volume of the first data is 1 kB decreased if being compared with the uncompressed first data and sets the compression ratio of the first data as ¼. Namely, the decreased data volume (i.e., 1 kB) of the first data after being compressed is ¼ of the data volume (i.e., 4 kB) of the uncompressed first data. However, in another exemplary embodiment, the compression ratio of the first data may be any number or expression for presenting the efficiency of compressing the first data, which is not limited in the present invention.

In the present exemplary embodiment, the compression speed of the first data refers to a data volume of the first data that can be compressed within each unit time during the compression of the first data. For example, it is assumed that the compression/decompression circuit 207 is capable of compressing a data volume of 400 MB (i.e., 400,000,000 bytes) per second during the compression of the first data, it indicates that the compression speed of the first data is 400 MB/sec. However, in another exemplary embodiment, the compression speed may also be referred to as a compression bandwidth, which is not limited in the present invention.

In the present exemplary embodiment, the data stream transmission speed of the second data refers to a data stream transmission speed at which the second data is transmitted to the rewritable non-volatile memory module 106 through the memory interface 206 if the first data is compressed to the second data. In the present exemplary embodiment, it is assumed that each portion of the compressed first data (i.e., the second data) may be immediately transmitted to the rewritable non-volatile memory module 106, the data stream transmission speed of the second data may probably be identical to the compression speed of the first data. For example, it is assumed that the compression speed of the first data is 400 MB/sec, the data stream transmission speed of the second data may approximately be 400 MB/sec. However, in another exemplary embodiment, the data stream transmission speed of the second data may probably be different from the compression speed of the first data, and the present invention is not limited thereto.

In the present exemplary embodiment, the decompression speed of the second data refers to a data volume of the compressed first data (i.e., the second data) that can be decompressed within each unit time after the compression of the first data. For example, it is assumed that the compression/decompression circuit 207 is capable of decompressing a data volume of 450 MB per second during the decompression of the second data, it indicates that the decompression speed of the second data is 450 MB/sec. Additionally, in another exemplary embodiment, the decompression speed may also be referred to as a decompression bandwidth, which is not limited in the present invention.

In the present exemplary embodiment, the data stream transmission speed of the decompressed second data refers to a data stream transmission speed at which the decompressed second data is transmitted to the host system 1000 through the host interface 204 if the second data is read from the rewritable non-volatile memory 106 and decompressed. In the present exemplary embodiment, it is assumed that each portion of the decompressed second data (i.e., the second data) may be immediately transmitted to the host system 1000, the data stream transmission speed of the decompressed second data may probably be identical to the decompression speed of the second data. For example, it is assumed that the decompression speed of the second data is 400 MB/sec, the data stream transmission speed of the decompressed second data may also approximately be 400 MB/sec. However, in another exemplary embodiment, the data stream transmission speed of the decompressed second data may probably be different from the decompression speed of the second data, and the present invention is not limited thereto.

In the present exemplary embodiment, whether the first data is the sequential data refers to whether the first data is data following the previously written data. For example, in the present exemplary embodiment, if the write command corresponding to the first data is a sequential write command, the first data is most likely the sequential data.

Otherwise, if the write command corresponding to the first data is a random write command, the first data is most likely not the sequential data. Thus, the memory management circuit 202 may determine whether the first data is the sequential data depending on whether the write command is the sequential write command or the random write command. For example, the memory management circuit 202 may obtain the last logical address used by the previous write command according to a logical address indicated by the previous write command plus logical address units corresponding to a data length of the write data of the previous write command. Then, the memory management circuit 202 may determine whether a logical address indicated by the current write command follows the last logical address used by the previous write command. If the logical address indicated by the current write command follows the last logical address used by the previous write command, the memory management circuit 202 may determine that the write command corresponding to the first data is the sequential write command, and the first data is the sequential data. Otherwise, if the logical address indicated by the current write command does not follows the last logical address used by the previous write command, the memory management circuit 202 may determine that the current write command corresponding to the first data is the random write command, and the first data is not the sequential data. Moreover, in another exemplary embodiment, the memory management circuit 202 may also utilize other determination mechanisms (e.g., a specific tag or a command code contained in the write command) to determine whether the write command corresponding to the first data is the sequential write command or the random write command, which construes no limitations to the present invention.

In the present exemplary embodiment, the memory management circuit 202 controls the compression/decompression circuit 207 to compress at least one portion of the first data to obtain compression information of the first data. For example, the compression information of the first data may include at least one of information with respect to the compression speed of the first data and the information with respect to the data stream transmission speed of the second data, which is not limited in the present invention. Additionally, in another embodiment, the memory management circuit 202 scans the first data to estimate the compression speed of the first data according to the content of the first data. For example, the memory management circuit 202 may analyze the composition of the first data to obtain complexity of the first data so as to estimate the compression speed of the first data. Alternatively, the memory management circuit 202 may obtain the compression speed of the first data by looking up in a lookup table where a relationship between data volume and compression speed are recorded according to the data volume (or the data length) of the first data, but the present invention is not limited thereto.

After the compression information of the first data is obtained, the memory management circuit 202 may obtain the initial data transmission information of the first data according to the compression information of the first data. For example, it is assumed that the compression speed of the first data obtained by the memory management circuit 202 after the at least one portion of the first data is compressed is 450 MB/sec, the memory management circuit 202 may estimate the data stream transmission speed of the second data, the decompression speed of the second data and/or the data stream transmission speed of the decompressed second data according to the compression speed of the first data. For example, the data stream transmission speed of the second data, the decompression speed of the second data and/or the data stream transmission speed of the decompressed second data estimated by the memory management circuit 202 may be approximately 450 MB/sec. Additionally, according to characteristics of different data compression techniques and/or types of transmission interfaces, the memory management circuit 202 may also increase or reduce the compression speed of the first data for obtaining the data stream transmission speed of the second data, the decompression speed of the second data and/or the data stream transmission speed of the decompressed second data, but the present invention is not limited thereto. Similarly, the memory management circuit 202 may also obtain the data volume of the second data in advance by compressing or scanning at least one portion of the first data and then obtain the compression ratio of the first data according to the data volume of the first data and the data volume of the second data.

In the present exemplary embodiment, the compression performed on the first data and the decompression performed on the second data by the compression/decompression circuit 207 is symmetrical. Taking the LZW compression technique for example, if the memory management circuit 202 determines to compress the first data, the memory management circuit 202 controls the compression/decompression circuit 207 to compress the first data to the second data and establish a dictionary (i.e., a first dictionary) with the compression of the first data so as to record a corresponding relationship between the first data and the second data by using the first dictionary. Then, if a read command corresponding to the first data is received by the memory management circuit 202 from the host system 1000, the memory management circuit 202 reads the second data from the rewritable non-volatile memory module 106 according to the read command and controls the compression/decompression circuit 207 to decompress the second data. If decompressing the second data, the compression/decompression circuit 207 establishes another dictionary (i.e., a second dictionary) with the decompression of the second data so as to record a corresponding relationship between the first data and the second data by using the second dictionary. In the present exemplary embodiment, the content recorded in the first dictionary is substantially identical to the content recorded in the second dictionary. The content recorded in the first dictionary is substantially identical to the content recorded in the second dictionary as referred herein indicates the corresponding relationships between the first data and the second data respectively recorded in the first dictionary and the second dictionary are identical (which conforms to the characteristics of the symmetrical compression/decompression technique), while formats of or partial auxiliary data recorded in the first and the second dictionaries may be identical or different, which are not limited in the present invention.

For example, if the memory management circuit 202 determines to compress a string "ABBBABAAB" (which is the first data), the compression/decompression circuit 207 is controlled to compress the string "ABBBABAAB" to generate a string "124313" (which is the second data) and establishes the first dictionary step by step with the compression of the first data. For example, the content of the first dictionary may include "1=A, 2=B, 3=AB, 4=BB, 5=BBA, 6=ABA and 7=AA". Then, the memory management circuit 202 writes the string "124313" (i.e., the second data) into the rewritable non-volatile memory module 106. After the string "124313" (i.e., the second data) is read from the rewritable non-volatile memory module 106, the compression/decompression circuit 207 decompresses the string "124313" (i.e., the second data) to "ABBBABAAB" (i.e., the first data) and establishes the second dictionary step by step with the decompression of the string "124313" (i.e., the second data). For example, the content of the second dictionary may also include "1=A, 2=B, 3=AB, 4=BB, 5=BBA, 6=ABA and 7=AA". To be more detailed, taking "1=A" respectively in the first and the second dictionaries for example, "1" may also be referred to as an index value, while "A" may be referred to dictionary content, and so on.

Based on the above description, in the present exemplary embodiment, if the compression/decompression circuit 207 compresses the first data, the compression/decompression circuit 207 generates the first dictionary step by step and completes the compression of the first data by using the first dictionary. If the compression/decompression circuit 207 decompresses the second data, the compression/decompression circuit 207 generates the second dictionary which is substantially identical to the first dictionary step by step and completes the decompression of the second data by using the second dictionary. That is to say, in the present exemplary embodiment, steps, processes and time for the compression/decompression circuit 207 to compress the first data and decompress the second data are similar. Accordingly, the compression speed of the first data and the decompression speed of the second data may be considered as identical or nearly identical. However, the present invention is not intended to limit the establishment of the first and the second dictionaries to the above description. For example, in an exemplary embodiment, the first dictionary and/or the second dictionary may be previously configured in the compression/decompression circuit 207 and/or the rewritable non-volatile memory module 106, instead of being established immediately with the compression of the first data and/or the decompression of the second data. If the second data is read from the rewritable non-volatile memory module 106, the compression/decompression circuit 207 may decompress the second data by using the first dictionary or the second dictionary. Alternatively, in another exemplary embodiment, the compression/decompression circuit 207 writes at least one portion of the immediately generated or pre-established first dictionary with the second data into the rewritable non-volatile memory module 106. If reading the second data from the rewritable non-volatile memory module 106, the memory management circuit 202 may also read the first dictionary from the rewritable non-volatile memory module 106 altogether. Then, the compression/decompression circuit 207 may use the first dictionary to decompress the second data. Additionally, in the present exemplary embodiment, the compression performed by the compression/decompression circuit 207 on the first data may be unsymmetrical from the decompression performed on the second data.

In the present exemplary embodiment, the compression/decompression circuit 207 has a plurality of compression/decompression channels. If compressing the first data, the compression/decompression circuit 207 may use the compression/decompression channels to compress different parts of the first data in parallel to generate the second data. Taking the use of two compression channels (referred to as a first compression channel and a second compression channel) for example, the compression/decompression circuit 207 may use the first and the second compression channels to compress a first part and a second part of the first data in parallel. Particularly, the compression of the second part of the first data using the second compression channel is performed based on a compression result of the first part the first data using the first compression channel. Taking the string "ABBBABAAB" for example, it is assumed that the first compression channel of the compression/decompression circuit 207 is in charge of compressing the 1st through the 4th bytes, i.e., "ABBA", and the second compression channel is in charge of compressing the 5th through 9th bytes, i.e., "ABAAB". The first channel of the compression/decompression circuit 207 first compresses the data "ABBB" to "124" in the second data, and writes "1=A, 2=B, 3=AB and 4=BB" into the first dictionary. Then, the second channel of the compression/decompression circuit 207 then compresses the data "ABAAB" to "313" in the second data based on "1=A, 3=AB" in the first dictionary. That is to say, the first and the second channels of the compression/decompression circuit 207 process the data "ABBB" and the data "ABAAB" in parallel; however, in fact, the second channel of the compression/decompression circuit 207 may wait until the compression result of the first channel is produced (e.g., part of the data in the dictionary is established) and then perform the data compression. In another exemplary embodiment, different compression/decompression channels individually establish their own dictionaries, and one of the compression/decompression channels does not have to wait for the compression result from another. Additionally, in another exemplary embodiment, the decompression/decompression circuit 207 may have only one compression/decompression channel, and the present invention is not intended to limit the number of the compression/decompression channels of the compression/decompression circuit 207.

In the present exemplary embodiment, the memory management circuit 202 determines whether the initial data transmission information conforms to a predetermined condition to determine whether to compress the first data. For example, the memory management circuit 202 may determine whether the initial data transmission information conforms to the predetermined condition according to at least one of whether the compression ratio of the first data conforms to a compression ration condition, whether the compression speed of the first data conforms to a compression speed condition, whether the data stream transmission speed of the second data conforms to a compression transmission speed condition, whether the decompression speed of the second data conforms to a decompression speed condition, whether the data stream transmission speed of the decompressed second data conforms to a decompression transmission speed condition and whether the first data is the sequential data.

The memory management circuit 202 may determine whether the compression ratio of the first data conforms to a compression ratio threshold. If the compression ratio of the first data conforms to (e.g., the compression ratio is greater than or equal to) the compression ratio threshold, the memory management circuit 202 determines that the compression ratio of the first data conforms to the compression ratio condition. If the compression ratio of the first data does not conform to (e.g., the compression ratio is less than) the compression ratio threshold, the memory management circuit 202 determines that the compression ratio of the first data does not conform to the compression ratio condition.

The memory management circuit 202 may determine whether the compression speed of the first data conforms to a compression speed threshold. If the compression speed of the first data conforms to (e.g., the compression speed is greater than or equal to) the compression speed threshold, the memory management circuit 202 determines that the compression speed of the first data conforms to the compression speed condition. If the compression speed of the first data does not conform to (e.g., the compression speed is less than) the compression speed threshold, the memory management circuit 202 determines that the compression speed of the first data does not conform to the compression speed condition.

The memory management circuit 202 may determine whether the data transmission speed of the second data conforms to a compression transmission speed threshold. If the data transmission speed of the second data conforms to (e.g., the data transmission speed is greater than or equal to) the compression transmission threshold, the memory management circuit 202 determines that the data transmission speed of the second data conforms to the compression transmission condition. If the data transmission speed of the second data does not conforms to (e.g., the data transmission speed is less than) the compression transmission threshold, the memory management circuit 202 determines that the data transmission speed of the second data does not conform to the compression transmission condition.

The memory management circuit 202 may determine whether the decompression speed of the second data conforms to a decompression speed threshold. If the decompression speed of the second data conforms to (e.g., the decompression speed is greater than or equal to) the decompression speed threshold, the memory management circuit 202 determines that the decompression speed of the second data conforms to the decompression speed condition. If the decompression speed of the second data does not conform to (e.g., the decompression speed is less than) the decompression speed threshold, the memory management circuit 202 determines that the decompression speed of the second data does not conform to the decompression speed condition.

The memory management circuit 202 may determine whether the data stream transmission speed of the decompressed second data conforms to a decompression transmission speed threshold. If the data stream transmission speed of the decompressed second data conforms to (e.g., the data stream transmission speed is greater than or equal to) the decompression transmission speed threshold, the memory management circuit 202 determines that the data stream transmission speed of the decompressed second data conforms to the decompression transmission speed condition. If the data stream transmission speed of the decompressed second data does not conform to (e.g., the data stream transmission speed is less than) the decompression transmission speed threshold, the memory management circuit 202 determines that the data stream transmission speed of the decompressed second data does not conform to the decompression transmission speed condition.

It is to be mentioned that each of the aforementioned determinations may be solely used or in a combination of any two, any three, any four, any five or any six of them simultaneously or used with the other determination mechanisms, which is not limited in the present invention. For example, in an exemplary embodiment, if the compression ratio of the first data conforms to the compression ration condition, the compression speed of the first data conforms to a compression speed condition, the data stream transmission speed of the second data conforms to a compression transmission speed condition, the decompression speed of the second data conforms to a decompression speed condition, the data stream transmission speed of the decompressed second data conforms to a decompression transmission speed condition, or the first data is the sequential data, the memory management circuit 202 determines that the initial data transmission information conforms to the predetermined condition. Moreover, in another exemplary embodiment, the memory management circuit 202 determines that the initial data transmission information conforms to the predetermined condition only if the compression ratio of the first data conforms to the compression ratio condition, and the decompression speed of the second data conforms to the decompression speed condition, but the present invention is not limited thereto.

If the initial data transmission information conforms to the predetermined condition, the memory management circuit 202 controls the compression/decompression circuit 207 to compress the first data to second data and writes the second data into the rewritable non-violate memory module 106. Additionally, if the initial data transmission information does not conform to the predetermined condition, the memory management circuit 202 writes the uncompressed first data into the rewritable non-violate memory module 106.

It is to be mentioned that read speeds (or bandwidths) of sequentially reading data and randomly reading data may be different. For example, the read speed for the host system 1000 sequentially reading data from the memory storage device 100 is commonly greater than the read speed for the host system 1000 randomly reading data from the memory storage device 100. Thus, in an exemplary embodiment, the memory management circuit 202 may also determine or adjust at least one of the compression ratio condition, the compression speed condition, compression transmission speed condition, the decompression speed condition and the decompression transmission speed condition according to whether the first data is the sequential data. For example, if the first data is the sequential data, the memory management circuit 202 may set a threshold of the at least one of the compression ratio condition, the compression speed condition, the compression transmission speed condition, the decompression speed condition and the decompression transmission speed condition to be a first threshold. If the first data is not the sequential data, the memory management circuit 202 may set a threshold of the at least one of the compression ratio condition, the compression speed condition, the compression transmission speed condition, the decompression speed condition and the decompression transmission speed condition to be a second threshold. The first threshold is higher than the second threshold. Moreover, a threshold of the compression ratio condition is also referred to as a compression ratio threshold, a threshold of the compression speed condition is also referred to as a compression speed threshold, a threshold of the decompression speed condition is also referred to as a decompression speed threshold, and a threshold of the decompression transmission speed condition is also referred to as a decompression transmission speed threshold.

Taking the decompression speed condition for example, in an exemplary embodiment, if the memory management circuit 202 determines that the write command corresponding to the first data is the sequential write command, it indicates that the first data should be the sequential data, and thus, the memory management circuit 202 sets the threshold of the decompression speed condition as a decompression speed threshold (referred to as a first decompression speed threshold) according to a predetermined read speed corresponding to a sequential reading operation. However, if the memory management circuit 202 determines that the write command corresponding to the first data is the random write command, it indicates that the first data should not be the sequential data, and thus, the memory management circuit 202 sets the threshold of the decompression speed condition as another decompression speed threshold (referred to as a second decompression speed threshold) according to a predetermined read speed corresponding to a random reading operation. Specially, the first decompression speed threshold is greater than the second decompression speed threshold. For example, it is assumed that the predetermined read speed of the memory management circuit 202 corresponding to the sequential read operation is 600 MB/sec, the memory management circuit 202 may set the decompression speed threshold to be 500 MB/sec (i.e., the first decompression speed threshold) if determining that the first data is the sequential data. In addition, it is assumed that the predetermined read speed of the memory management circuit 202 corresponding to the random read operation is 300 MB/sec, the memory management circuit 202 may set the decompression speed threshold to be 250 MB/sec (i.e., the second decompression speed threshold) if determining that the first data is not the sequential data. That is, if the first data is the sequential data, the memory management circuit 202 may set the decompression speed threshold to be a value of the predetermined read speed corresponding to the sequential read operation multiplied by a specific multiple (e.g., $5/6$). If the first data is not the sequential data, the memory management circuit 202 may set the decompression speed threshold to be a value of the predetermined read speed corresponding to the random read operation multiplied by the specific multiple (e.g., $5/6$). However, such specific multiple may be varied according to whether the first data is the sequential data or the random data. Moreover, the memory management circuit 202 may also set the first decompression speed threshold and the second decompression speed threshold according to a user-defined command or any rule, and the present invention is not limited thereto.

Likewise, taking the decompression speed condition for example, in another exemplary embodiment, the memory management circuit 202 obtains a read speed decreased proportion according to the decompression speed of the second data and the predetermined read speed. The read speed decreased proportion referred herein refers to a decreased proportion of a data volume which is transmitted from the memory storage device 100 to the host system 1000 per unit time. Additionally, the predetermined read speed referred herein refers to the read speed at which the host system 1000 reads data from the memory storage device 100 in an ordinary scenario. The predetermined read speed may be a default value or varied with whether the write command corresponding to the first data is the sequential write command or the random write command. For example, in response to whether the write command corresponding to the first data is the sequential write command or the random write command, the predetermined read speed may be a predetermined read speed corresponding to the sequential read operation or a predetermined read speed corresponding to the random read operation. Then, the memory management circuit 202 determines whether the read speed decreased proportion conforms to a predetermined speed decreased proportion. For example, it is assumed that the decompression speed of the second data obtained by the memory management circuit 202 is 300 MB/sec, and the predetermined read speed is 600 MB/sec, then, the memory management circuit 202 may obtain that the read speed decreased proportion is $1/2$ (i.e., $300/600$). Then, if the predetermined speed decreased proportion is $1/6$, the memory management circuit 202 learns that the obtained read speed decreased proportion (i.e., $1/2$) does not conform to (e.g., is greater than) the predetermined speed decreased proportion (i.e., $1/6$). Moreover, it is assumed that the decompression speed of the second data is 270 MB/sec, and the predetermined read speed is 300 MB/sec, then, the memory management circuit 202 may obtain that the read speed decreased proportion is $1/10$ (i.e., $30/300$). If the predetermined speed decreased proportion is $1/6$, the memory management circuit 202 learns that the obtained read speed decreased proportion (i.e., $1/10$) conforms to (e.g., is less than or equal to) the predetermined speed decreased proportion (i.e., $1/6$). If the read speed decreased proportion conforms to the predetermined speed decreased proportion, the memory management circuit 202 determines that the decompression speed of the second data conforms to the decompression speed condition. Otherwise, if the read speed decreased proportion does not conform to the predetermined speed decreased proportion, the memory management circuit 202 determines that the decompression speed of the second data does not conform to the decompression speed condition. Additionally, the decompression speed of the second data in the present exemplary embodiment may also be replaced by the compression speed of the first data, the data stream transmission speed of the second data or the data stream transmission speed of the decompressed second data and so on likewise, which is not limited in the present invention.

In an exemplary embodiment, the memory management circuit 202 may also determine whether valid data collected by a garbage collection procedure of the rewritable non-volatile memory module 106 include uncompressed data. If the valid data collected by the garbage collection procedure includes uncompressed data, the memory management circuit 202 obtains data transmission information (referred to as follow-up data transmission information) of the uncompressed data that is included in the collected valid data and then determines whether to compress the uncompressed data included in the collected valid data according to the follow-up data transmission information. Taking the exemplary embodiment illustrated in FIG. 7 for example, it is assumed that the memory management circuit 202 writes the uncompressed first data into the physical erasing unit 410(0) in the rewritable non-volatile memory module 106. If the rewritable non-volatile memory module 106 performs the garbage collection procedure on the physical erasing unit 410(0), the memory management circuit 202 determines whether valid data collected by the garbage collection procedure includes at least part of the uncompressed first data. If determining that the valid data collected by a garbage collection procedure includes at least part of the uncompressed first data, the memory management circuit 202 obtains follow-up data transmission information of the at least part of the first data and determines whether the follow-up data transmission information conforms to the predetermined condition. If the follow-up data transmission information conforms to the predetermined condition, the memory management circuit 202 controls the compression/decompression circuit 207 to compress the at least part of the first data to another data (referred to as third data hereinafter) and rewrites the third data with the garbage collection procedure into the rewritable non-violate memory module 106. For instance, the memory management circuit 202 may send a third command sequence containing one or more third commands to the rewritable non-volatile memory module 106. The third command sequence is configured to instruct the third data to be written into the rewritable non-volatile memory module 106. Otherwise, if the follow-up data transmission information does not conform to the predetermined condition, the memory management circuit 202 does not compress the at least part of the uncompressed first data. The follow-up data transmission information referred in the present exemplary embodiment is similar to the aforementioned initial data transmission information, and details of the determination mechanisms may refer to the description of each exemplary embodiment above, which ill not be repeatedly described hereinafter.

Figure 8:
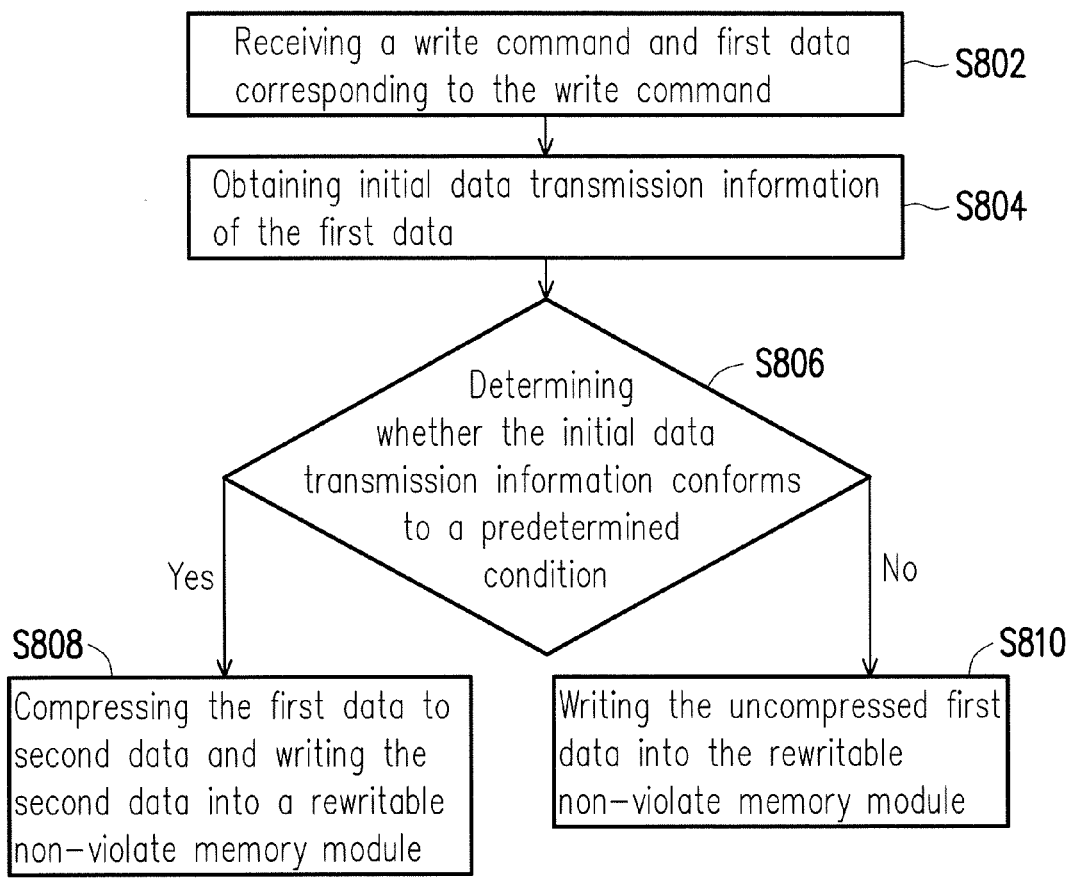
FIG. 8 is a flowchart of a method for writing data according to an exemplary embodiment of the present invention.

FIG. 8 is a flowchart of a method for writing data according to an exemplary embodiment of the present invention.

Referring to FIG. 8, in step S802, the memory management circuit 202 receives a write command and first data corresponding to the write command.

In step S804, the memory management circuit 202 obtains initial data transmission information of the first data.

In step S806, the memory management circuit 202 determines whether the initial data transmission information conforms to a predetermined condition.

If the initial data transmission information conforms to the predetermined condition, in step S808, the memory management circuit 202 controls the compression/decompression circuit 207 to compress the first data to second data and writes the second data into the rewritable non-violate memory module 106.

If determining that the initial data transmission information does not conform to the predetermined condition, in step S810, the memory management circuit 202 directly writes the uncompressed first data into the rewritable non-violate memory module 106.

Figure 9:
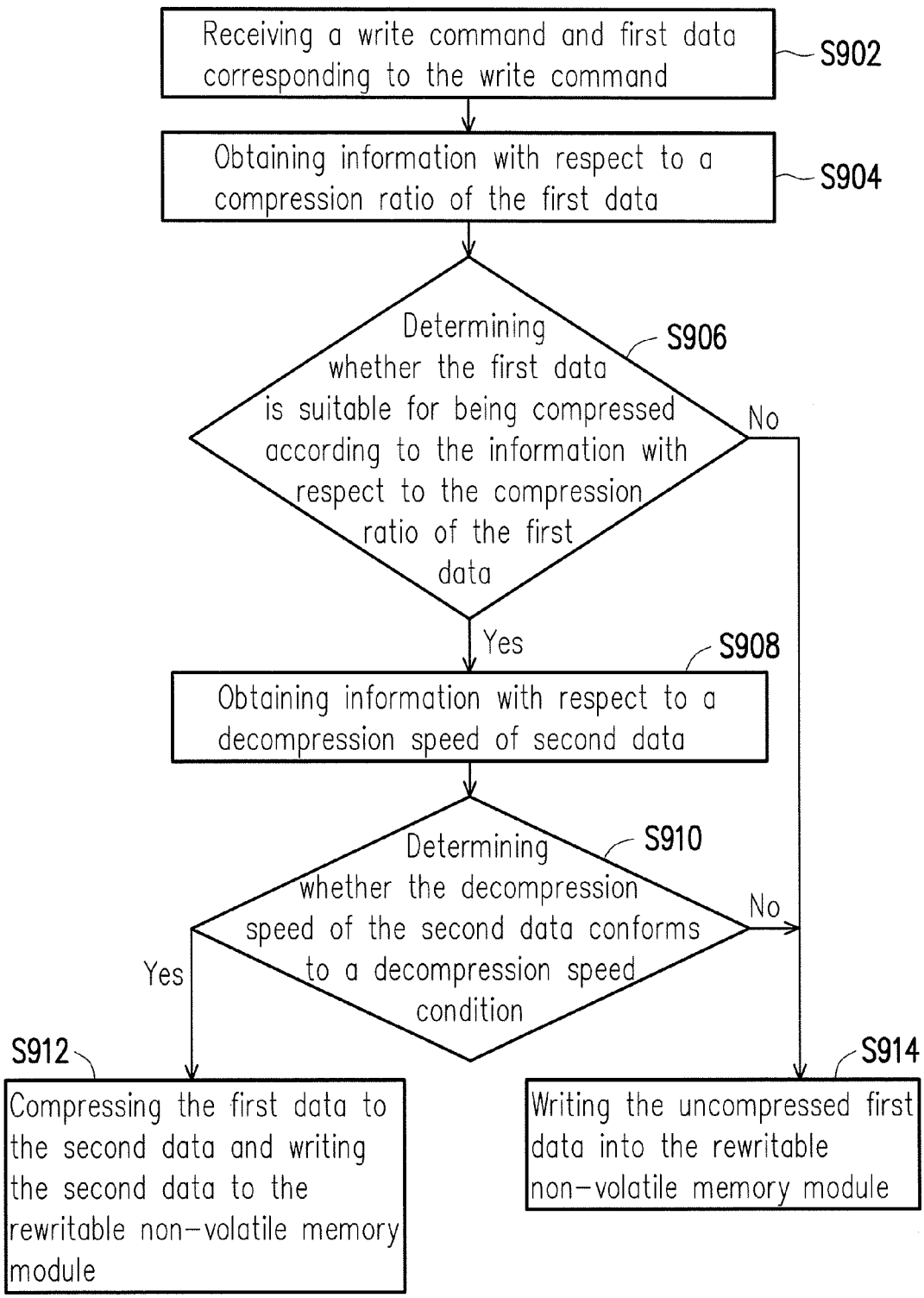
FIG. 9 is a flowchart of a method for writing data according to another exemplary embodiment of the present invention.

FIG. 9 is a flowchart of a method for writing data according to another exemplary embodiment of the present invention.

Referring to FIG. 9, in step S902, the memory management circuit 202 receives a write command and first data corresponding to the write command.

In step S904, the memory management circuit 202 obtains information with respect to a compression ratio of the first data.

In step S906, the memory management circuit 202 determines whether the first data is suitable for being compressed or not according to the compression ratio. For example, the memory management circuit 202 may determines whether the first data is suitable for being compressed or not according to whether the compression ratio of the first data conforms to a compression ration condition. If the compression ratio of the first data conforms to the compression ration condition, the memory management circuit 202 determines that the first data is suitable for being compressed. Otherwise, if the compression ratio of the first data does not conform to the compression ration condition, the memory management circuit 202 determines that the first data is unsuitable for being compressed.

If determining that the first data is unsuitable for being compressed, in step S914, the memory management circuit 202 directly writes the uncompressed first data into the rewritable non-violate memory module 106.

If determining that the first data is suitable for being compressed, in step S908, the memory management circuit 202 obtains information with respect to a decompression speed of the second data.

In step S910, the memory management circuit 202 determines whether the decompression speed of the second data conforms to a decompression speed condition. For example, the memory management circuit 202 may determines whether the decompression speed of the second data conforms to a decompression speed threshold. If the decompression speed of the second data conforms to the decompression speed threshold, the memory management circuit 202 may determine that the decompression speed of the second data conforms to the decompression speed condition. Otherwise, if the decompression speed of the second data does not conform to the decompression speed threshold, the memory management circuit 202 may determines that the decompression speed of the second data does not conform to the decompression speed condition.

If determining that the decompression speed of the second data conforms to the decompression speed condition, in step S912, the memory management circuit 202 controls the compression/decompression circuit 207 to compress the first data to the second data and writes the second data into the rewritable non-violate memory module 106.

If determining that the decompression speed of the second data does not conform to the decompression speed condition, in step S914, the memory management circuit 202 directly writes the uncompressed first data into the rewritable non-violate memory module 106.

It is to be mentioned that in the exemplary embodiment illustrated in FIG. 9, whether to compress the first data is determined depending on whether the compression ration of the first data conforms to the compression ration condition and whether the decompression speed of the second data conforms to the decompression speed condition. However, in other exemplary embodiments, whether the compression speed of the first data conforms to a compression speed condition, whether the data stream transmission speed of the second data conforms to a compression transmission speed condition, whether the data stream transmission speed of the decompressed second data conforms to a decompression transmission speed condition and whether the first data is the sequential data may be solely selected, or at least two of the conditions may be selected in replacement with or in use together with the determination conditions used in the exemplary embodiment illustrated in FIG. 9. Additionally, step S908 illustrated in FIG. 9 may also be performed in step S904, and/or steps S906 and S910 may also be simultaneously performed or the sequence of the two steps may be exchanged. For example, the determination of step S910 may be first performed, and if the determination result is yes, the determination of step S906 continues to be performed, which is not limited in the present invention. Moreover, each step illustrated in FIG. 8 and FIG. 9 has been described as above and will not repeated hereinafter. It is should be noted that each step illustrated in FIG. 8 and FIG. 9 may be implemented as a plurality of program codes or circuits, but construes no limitations to the present invention. The methods illustrated in FIG. 8 and FIG. 9 may be implemented together with the exemplary embodiments above or may be performed solely, and the present invention is not limited thereto.

To conclude, in the method for writing data, the memory storage device and the memory control circuit unit provided by the present invention, before data is written into the rewritable non-volatile memory module, the data transmission information of the data to be written is obtained in advance, and whether to compress the data is determined according to the data transmission information, so as to effectively reduce issues that the read speed in the later data reading operation is affected due to bad decompression efficiency of the data.

Although the present invention has been disclosed by the above embodiments, they are not intended to limit the present invention. It will be apparent to one of ordinary skill in the art that modifications and variations to the present invention may be made without departing from the spirit and scope of the present invention. Therefore, the scope of the present invention will be defined by the appended claims.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for writing data, adapted to a memory control circuit unit, the method comprising:
   receiving a write command and first data corresponding to the write command;
   obtaining initial data transmission information of the first data according to compression information of the first data, wherein the initial data transmission information of the first data comprises information with respect to whether the first data is sequential; and
   determining whether the initial data transmission information conforms to a predetermined condition according to whether the first data is the sequential data;
   if the initial data transmission information conforms to the predetermined condition, compressing the first data to second data and writing the second data into a rewritable non-violate memory module; and
   if the initial data transmission information does not conform to the predetermined condition, writing the first data into the rewritable non-violate memory module,
   wherein the compression information of the first data further comprises information with respect to a data stream transmission rate of the second data, and the data stream transmission rate of the second data is a rate at which the second data is being transmitted to the rewritable non-volatile memory module through the memory interface,
   wherein the step of determining whether the initial data transmission information conforms to the predetermined condition according to whether the first data is the sequential data further comprising:
   determining that the initial data transmission information conforms to the predetermined condition according to a threshold of the predetermined condition comprising at least one of a compression ratio condition, a compression speed condition, a decompression transmission speed condition, a decompression speed condition and a decompression transmission speed condition;
   if the first data is the sequential data, setting the threshold of the predetermined condition to be a first threshold; and
   if the first data is not the sequential data, setting the threshold of the predetermined condition to be a second threshold,
   wherein the first threshold is higher than the second threshold.

2. The method as claimed in claim 1, wherein the step of obtaining the initial data transmission information of the first data comprises:
   compressing or scanning at least a portion of the first data to obtain the compression information of the first data, wherein the compression information of the first data further comprises at least one of information with respect to a compression speed of the first data.

3. The method as claimed in claim 1, wherein the initial data transmission information of the first data further comprises at least one of information with respect to a compression ratio of the first data, information with respect to a compression speed of the first data, the information with respect to the data stream transmission rate of the second data, information with respect to a decompression speed of the second data, and information with respect to a data stream transmission rate of the decompressed second data.

4. The method as claimed in claim 3, wherein the step of determining whether the initial data transmission information conforms to the predetermined condition further comprises:
   determining whether the initial data transmission information conforms to the predetermined condition according to at least one of whether the compression ratio of the first data conforms to the compression ration condition, whether the compression speed of the first data conforms to the compression speed condition, whether the data stream transmission rate of the second data conforms to the compression transmission speed condition, whether the decompression speed of the second data conforms to the decompression speed condition and whether the data stream transmission rate of the decompressed second data conforms to the decompression transmission speed condition.

5. The method as claimed in claim 4, further comprising:
   determining whether the decompression speed of the second data conforms to a decompression speed threshold; and
   if determining that the decompression speed of the second data conforms to the decompression speed threshold, determining that the decompression speed of the second data conforms to the decompression speed condition.

6. The method as claimed in claim 4, further comprising:
   obtaining a read speed decreased proportion according to the decompression speed of the second data and a predetermined read speed;
   determining whether the read speed decreased proportion conforms to a predetermined speed decreased proportion;
   if determining that the read speed decreased proportion conforms to the predetermined speed decreased proportion, determining that the decompression speed of the second data conforms to the decompression speed condition; and
   if determining that the read speed decreased proportion does not conform to the predetermined speed decreased proportion, determining that the decompression speed of the second data does not conform to the decompression speed condition.

7. The method as claimed in claim 1, wherein after the step of writing the first data into the rewritable non-volatile memory module, the method further comprises:
   if valid data collected by a garbage collection procedure of the rewritable non-volatile memory module comprises at least one portion of the first data, obtaining follow-up data transmission information of the at least one portion of the first data and determining whether the follow-up data transmission information conforms to the predetermined condition;
   if the follow-up data transmission information conforms to the predetermined condition, compressing the at least one portion of the first data to third data and writing the third data into the rewritable non-violate memory module; and if the follow-up data transmission information does not conform to the predetermined condition, not compressing the at least one portion of the first data.

8. The method as claimed in claim 1, wherein the step of compressing the first data to the second data comprises:
using a first compression channel and a second compression channel to compress a first portion of the first data and a second portion of the first data in parallel to generate the second data,
wherein the compression performed on the second portion of the first data by the second compression channel is based on a compression result of the compression performed on the first portion of the first data by the first compression channel.

9. The method as claimed in claim 1, wherein the step of compressing the first data to the second data comprises:
establishing a first dictionary with the compression of the first data, and the method further comprises:
receiving a read command and reading the second data from the rewritable non-volatile memory module according to the read command; and
decompressing the second data and establishing a second dictionary with the decompression of the second data, wherein the first dictionary is substantially identical to the second dictionary.

10. A memory storage device, comprising:
a connection interface unit, configured to be coupled to a host system;
a rewritable non-volatile memory module; and
a memory control circuit unit, coupled with the connection interface unit and the rewritable non-volatile memory module, wherein the memory control circuit unit is configured to perform operations of:
receiving a write command and first data corresponding to the write command;
obtaining initial data transmission information of the first data according to compression information of the first data, wherein the initial data transmission information of the first data comprises information with respect to whether the first data is sequential; and
determining whether the initial data transmission information conforms to a predetermined condition according to whether the first data is the sequential data;
if the initial data transmission information conforms to the predetermined condition, compressing the first data to second data and writing the second data into the rewritable non-violate memory module; and
if the initial data transmission information does not conform to the predetermined condition, writing the first data into the rewritable non-violate memory module,
wherein the compression information of the first data further comprises information with respect to a data stream transmission rate of the second data, and the data stream transmission rate of the second data is a speed at which the second data is transmitted to the rewritable non-volatile memory module through the memory interface,
wherein the operation of determining whether the initial data transmission information conforms to the predetermined condition according to whether the first data is the sequential data further comprising:
wherein the memory control circuit unit is further configured to determine that the initial data transmission information conforms to the predetermined condition according to a threshold of the predetermined condition comprising at least one of a compression ratio condition, a compression speed condition, a decompression transmission speed condition, a decompression speed condition and a decompression transmission speed condition;
if the first data is the sequential data, setting the threshold of the predetermined condition to be a first threshold; and
if the first data is not the sequential data, setting the threshold of the predetermined condition to be a second threshold,
wherein the first threshold is higher than the second threshold.

11. The memory storage device as claimed in claim 10, wherein the operation of obtaining the initial data transmission information of the first data comprises:
compressing or scanning at least a portion of the first data to obtain the compression information of the first data, wherein the compression information of the first data further comprises at least one of information with respect to a compression speed of the first data.

12. The memory storage device as claimed in claim 10, wherein the initial data transmission information of the first data further comprises at least one of information with respect to a compression ratio of the first data, information with respect to a compression speed of the first data, the information with respect to the data stream transmission rate of the second data, information with respect to a decompression speed of the second data, and information with respect to a data stream transmission rate of the decompressed second data.

13. The memory storage device as claimed in claim 12, wherein the operation of determining whether the initial data transmission information conforms to the predetermined condition further comprises:
determining whether the initial data transmission information conforms to the predetermined condition according to at least one of whether the compression ratio of the first data conforms to the compression ration condition, whether the compression speed of the first data conforms to the compression speed condition, whether the data stream transmission rate of the second data conforms to the compression transmission speed condition, whether the decompression speed of the second data conforms to the decompression speed condition and whether the data stream transmission rate of the decompressed second data conforms to the decompression transmission speed condition.

14. The memory storage device as claimed in claim 13, wherein the memory control circuit unit is further configured to perform operations of:
determining whether the decompression speed of the second data conforms to a decompression speed threshold; and
if determining that the decompression speed of the second data conforms to the decompression speed threshold, determining that the decompression speed of the second data conforms to the decompression speed condition.

15. The memory storage device as claimed in claim 13, wherein the memory control circuit unit is further configured to perform operations of:
obtaining a read speed decreased proportion according to the decompression speed of the second data and a predetermined read speed;
determining whether the read speed decreased proportion conforms to a predetermined speed decreased proportion;

if the read speed decreased proportion conforms to the predetermined speed decreased proportion, determining that the decompression speed of the second data conforms to the decompression speed condition; and if the read speed decreased proportion does not conform to the predetermined speed decreased proportion, determining that the decompression speed of the second data does not conform to the decompression speed condition.

16. The memory storage device as claimed in claim 10, wherein after the first data is written into the rewritable non-volatile memory module, the memory control circuit unit is further configured to perform operations of:

if valid data collected by a garbage collection procedure of the rewritable non-volatile memory module comprises at least one portion of the first data, obtaining follow-up data transmission information of the at least one portion of the first data and determining whether the follow-up data transmission information conforms to the predetermined condition;

if the follow-up data transmission information conforms to the predetermined condition, compressing the at least one portion of the first data to third data and writing the third data into the rewritable non-violate memory module; and if the follow-up data transmission information does not conform to the predetermined condition, not compressing the at least one portion of the first data.

17. The memory storage device as claimed in claim 10, wherein the operation of compressing the first data to the second data comprises:

using a first compression channel and a second compression channel to compress a first portion of the first data and a second portion of the first data in parallel to generate the second data, wherein the compression performed on the second portion of the first data by the second compression channel is based on a compression result of the compression performed on the first portion of the first data by the first compression channel.

18. The memory storage device as claimed in claim 10, wherein the operation of compressing the first data to the second data comprises:

establishing a first dictionary with the compression of the first data, wherein the memory control circuit unit is further configured to perform operations of:

receiving a read command and reading the second data from the rewritable non-volatile memory module according to the read command; and decompressing the second data and establishing a second dictionary with the decompression of the second data, wherein the first dictionary is substantially identical to the second dictionary.

19. A memory control circuit unit, for controlling a rewritable non-volatile memory module, the memory control circuit unit comprising:

a host interface, configured to be coupled to a host system;
a memory interface, configured to be coupled to the rewritable non-volatile memory module;
a compression/decompression circuit; and
a memory management circuit, coupled with the host interface, the memory interface and the compression/decompression circuit, wherein the memory management circuit is configured to perform operations of:
receiving a write command and first data corresponding to the write command;

obtaining initial data transmission information of the first data according to compression information of the first data, wherein the initial data transmission information of the first data comprises information with respect to whether the first data is sequential; and determining whether the initial data transmission information conforms to a predetermined condition according to whether the first data is the sequential data;

if the initial data transmission information conforms to the predetermined condition, controlling the compression/decompression circuit to compress the first data to second data and sending a first command sequence configured to instruct the second data to be written into the rewritable non-violate memory module; and if the initial data transmission information does not conform to the predetermined condition, sending a second command sequence configured to instruct the first data to be written into the rewritable non-violate memory module, wherein the compression information of the first data further comprises information with respect to a data stream transmission rate of the second data, and the data stream transmission rate of the second data is a speed at which the second data is transmitted to the rewritable non-volatile memory module through the memory interface, wherein the operation of determining whether the initial data transmission information conforms to the predetermined condition according to whether the first data is the sequential data further comprising:

determining that the initial data transmission information conforms to the predetermined condition according to a threshold of the predetermined condition comprising at least one of a compression ratio condition, a compression speed condition, a decompression transmission speed condition, a decompression speed condition and a decompression transmission speed condition;

if the first data is the sequential data, setting the threshold of the predetermined condition to be a first threshold; and if the first data is not the sequential data, setting the threshold of the predetermined condition to be a second threshold, wherein the first threshold is higher than the second threshold.

20. The memory control circuit unit as claimed in claim 19, wherein the operation of obtaining the initial data transmission information of the first data comprises:

controlling the compression/decompression circuit to compress or scan at least a portion of the first data to obtain the compression information of the first data, wherein the compression information of the first data further comprises at least one of information with respect to a compression speed of the first data.

21. The memory control circuit unit as claimed in claim 19, wherein the initial data transmission information of the first data further comprises at least one of information with respect to a compression ratio of the first data, information with respect to a compression speed of the first data, the information with respect to the data stream transmission rate of the second data, and information with respect to a decompression speed of the second data, information with respect to a data stream transmission rate of the decompressed second data.

22. The memory control circuit unit as claimed in claim 21, wherein the operation of determining whether the initial data transmission information conforms to the predetermined condition further comprises:
  determining whether the initial data transmission information conforms to the predetermined condition according to at least one of whether the compression ratio of the first data conforms to the compression ration condition, whether the compression speed of the first data conforms to the compression speed condition, whether the data stream transmission rate of the second data conforms to the compression transmission speed condition, whether the decompression speed of the second data conforms to the decompression speed condition and whether the data stream transmission rate of the decompressed second data conforms to the decompression transmission speed condition.

23. The memory control circuit unit as claimed in claim 22, wherein the memory management circuit is further configured to perform operations of:
  determining whether the decompression speed of the second data conforms to a decompression speed threshold; and
  if determining that the decompression speed of the second data conforms to the decompression speed threshold, determining that the decompression speed of the second data conforms to the decompression speed condition.

24. The memory control circuit unit as claimed in claim 22, wherein the memory management circuit is further configured to perform operations of:
  obtaining a read speed decreased proportion according to the decompression speed of the second data and a predetermined read speed;
  determining whether the read speed decreased proportion conforms to a predetermined speed decreased proportion;
  if the read speed decreased proportion conforms to the predetermined speed decreased proportion, determining that the decompression speed of the second data conforms to the decompression speed condition; and
  if the read speed decreased proportion does not conform to the predetermined speed decreased proportion, determining that the decompression speed of the second data does not conform to the decompression speed condition.

25. The memory control circuit unit as claimed in claim 19, wherein after the second command sequence is sent, the memory management circuit is further configured to perform operations of:
  if valid data collected by a garbage collection procedure of the rewritable non-volatile memory module comprises at least one portion of the first data, obtaining follow-up data transmission information of the at least one portion of the first data and determining whether the follow-up data transmission information conforms to the predetermined condition;
  if the follow-up data transmission information conforms to the predetermined condition, controlling the compression/decompression circuit to compress the at least one portion of the first data to third data and sending a third command sequence configured to instruct the third data to be written into the rewritable non-violate memory module; and
  if the follow-up data transmission information does not conform to the predetermined condition, not controlling the compression/decompression circuit to compress the at least one portion of the first data.

26. The memory control circuit unit as claimed in claim 19, wherein the operation of controlling the compression/decompression circuit to compress the first data to the second data comprises:
  using a first compression channel and a second compression channel to compress a first portion of the first data and a second portion of the first data in parallel to generate the second data,
  wherein the compression performed on the second portion of the first data by the second compression channel is based on a compression result of the compression performed on the first portion of the first data by the first compression channel.

27. The memory control circuit unit as claimed in claim 19, wherein the operation of controlling the compression/decompression circuit to compress the first data to the second data comprises:
  establishing a first dictionary with the compression of the first data,
  wherein the memory management circuit is further configured to perform operations of:
  receiving a read command and reading the second data from the rewritable non-volatile memory module according to the read command; and
  controlling the compression/decompression circuit to decompress the second data and establishing a second dictionary with the decompression of the second data,
  wherein the first dictionary is substantially identical to the second dictionary.

* * * * *